United States Patent [19]
Walser

[11] 3,802,746
[45] Apr. 9, 1974

[54] ARTICULATED TRACTOR VEHICLE POWER STEERING AND BRAKE SYSTEM HAVING AN EMERGENCY BRAKE DEVICE

[75] Inventor: Melvin L. Walser, Lubbock, Tex.

[73] Assignee: Clark Equipment Company, Buchanan, Mich.

[22] Filed: Aug. 23, 1972

[21] Appl. No.: 283,020

[52] U.S. Cl. .................... 303/10, 188/170
[51] Int. Cl. .............................. B60t 13/16
[58] Field of Search..... 180/6.48; 188/106 F, 106 P, 188/170; 303/2, 9, 10, 7

[56] References Cited
UNITED STATES PATENTS

| | | | |
|---|---|---|---|
| 3,463,276 | 8/1969 | Brooks | 188/170 X |
| 3,599,761 | 8/1971 | Schultz | 188/170 |
| 3,547,233 | 12/1970 | Girvan | 188/170 |
| 3,695,731 | 10/1972 | England et al. | 188/170 X |
| 3,528,707 | 9/1970 | Casey | 188/170 X |

*Primary Examiner*—Duane A. Reger
*Attorney, Agent, or Firm*—Jack E. Toliver

[57] ABSTRACT

A power steering and brake system for a vehicle, especially an off-highway articulated vehicle, having a brake actuating accumulator by diverting a small amount of fluid flow from a steering circuit. A self acting emergency brake is activated upon loss of accumulator pressure below a level satisfactory for operating the service brakes. The emergency brake may also be selectively operated as a parking brake when the vehicle is halted by dumping pressure from the accumulator.

3 Claims, 2 Drawing Figures

3,802,746

ARTICULATED TRACTOR VEHICLE POWER STEERING AND BRAKE SYSTEM HAVING AN EMERGENCY BRAKE DEVICE

BACKGROUND OF THE INVENTION

1. Field of the Invention

The invention pertains to the art of power vehicle systems and more particularly to a fluid power steering and brake system for off-highway vehicles such as a self-propelled elevating tractor scraper steered by turning the tractor relative to the scraper using steering jacks located on each side between the vehicle sections. The vehicle service brakes for the tractor and scraper wheels are controlled by the operator from the tractor.

2. Description of the Prior Art

The hydraulic circuit for a tractor scraper may have two or more pumps for operating the elevator and other components such as the steering jacks, end gate and slidable bottom door. One pump and a portion of the circuit will have characteristics particularly designed for operating the scraper elevator. For example, this may be a dual sectioned pump providing extra hydraulic capacity used when heavy loading conditions are encountered by the elevator so as to better maintain the optimum speed of the elevator. The output of a second pump may supply pressure to another portion of the circuit such as the steering jacks. Still another pump will operate the service brakes through another portion of the main hydraulic circuit.

There have been efforts to integrate portions of the hydraulic system having different hydraulic functions providing what may be termed a "piggyback" hydraulic circuit.

For instance, articulated tractor scrapers will, in the case of a two wheeled, overhung tractor, have steering jacks, one on each side, which effect turning movement of the tractor relative to the scraper about a vertical turning axis between the vehicle sections. A steering valve is controlled by the tractor steering wheel. This valve controls the supply of hydraulic fluid to the steering jacks causing one to extend and the other to retract as the steering wheel is rotated in one direction or the other.

The piggyback portion of the circuit may have a power brake valve which uses the fluid power developed for the power steering system to also actuate the tractor and scraper service brakes thus performing a dual function without impairing the fluid flow characteristics required for operating the power steering and eliminating the need for a separate brake circuit.

Specifically, an hydraulic brake valve controls the charging rate of an accumulator. All the hydraulic fluid from the steering pump flows through the brake valve. Whenever accumulator pressure drops below a safe minimum pressure for operating the service brakes, the brake valve automatically diverts a small amount of hydraulic fluid from the steering system to charge the accumulator. The charging rate is only a few gallons per minute and thus does not exceed at any time the maximum demands which may be placed on the system by the steering portion of the circuit. When the accumulator pressure reaches its high limit, the brake valve automatically shuts off the charging circuit and all fluid is available for steering. When the operator wishes to apply the brakes, the pressure of the fluid in the accumulator is released to flow through the brake lines to the wheel cylinders actuating the service brakes on the tractor and scraper. Thus the pressure for operating the steering jacks is maintained during the braking action with full flow being restored relatively quickly after the amount of fluid required for recharging the accumulator is diverted from the steering system.

SUMMARY OF THE INVENTION

As a further development of the piggyback brake systems an auxiliary brake is employed as either an emergency or parking brake without diminishing the power of the system. In accordance with the invention an emergency brake is actuated into a brake engaging position whenever the service brake accumulator drops below a satisfactory level. The accumulator pressure is connected to the emergency brake cylinder to hold the emergency brake heads in a disengaged position during normal operation. Should there be a loss in accumulator pressure below that necessary for satisfactory operation of the service brakes, the emergency brake heads will be self-applied to provide the emergency braking action.

A manually controlled valve may be used to dump pressure from the emergency brake cylinder while interrupting communication with the accumulator, thus enabling the emergency brake to be selectively applied as a parking brake when the vehicle is halted.

In the preferred embodiment, the emergency brake heads are engageable with a drive line component of the tractor, such as the drive shaft input to the differential.

One advantage seen had by the invention is the provision of an emergency/parking brake which has no parasitic effect on the main hydraulic system.

Another advantage is the fail safe aspects of an emergency brake actuated automatically upon loss of operating brake pressure.

Still another advantage is an emergency/parking brake which is not operated through application of the service brake heads but is separate from the wheel brakes entirely.

These and other objects will be more apparent by reference to the following detailed description of the preferred embodiment of the invention which proceeds with a description of the drawings.

DESCRIPTION OF THE PREFERRED EMBODIMENT

Figure 1:
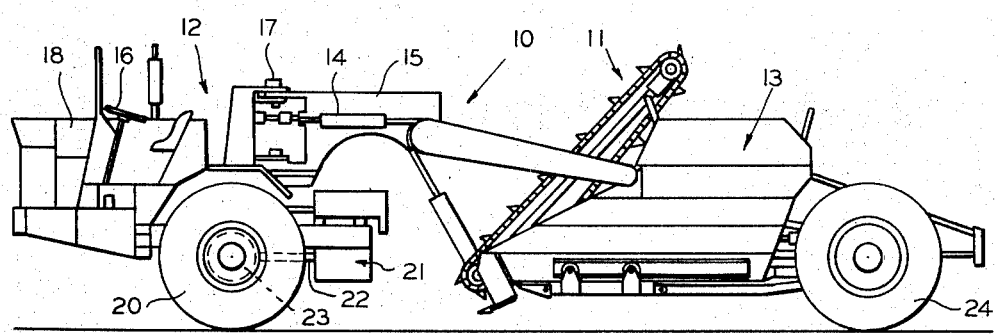
FIG. 1 is a side elevational view of an elevating scraper having a power brake and steering system according to the invention.

FIG. 1 shows a tractor scraper 10 having a tractor 12 for towing a scraper 13. An elevator 11 assists in loading the scraper in a known manner. A pair of steering jacks 14, one on each side of a yoke 15, is controlled by a steering valve, referred to hereinafter, operated by the steering wheel 16 on the tractor for effecting turning movement of the tractor relative to the scraper about a vertical turning axis at 17. The steering valve is connected to the main hydraulic system of the tractor which includes an hydraulic pump, also referred to hereinafter, driven by the tractor engine located generally at 18. Wheels 20 on the tractor are driven by the engine through a drive train indicated generally at 21 having a forwardly extending drive line 22 connected to the tractor differential generally at 23. The scraper 13 is supported at the rear by wheels 24. Service brakes for the tractor wheels 20 and the scraper wheels 24 are connected to the main hydraulic system of the tractor, a portion of which is described below.

Figure 2:
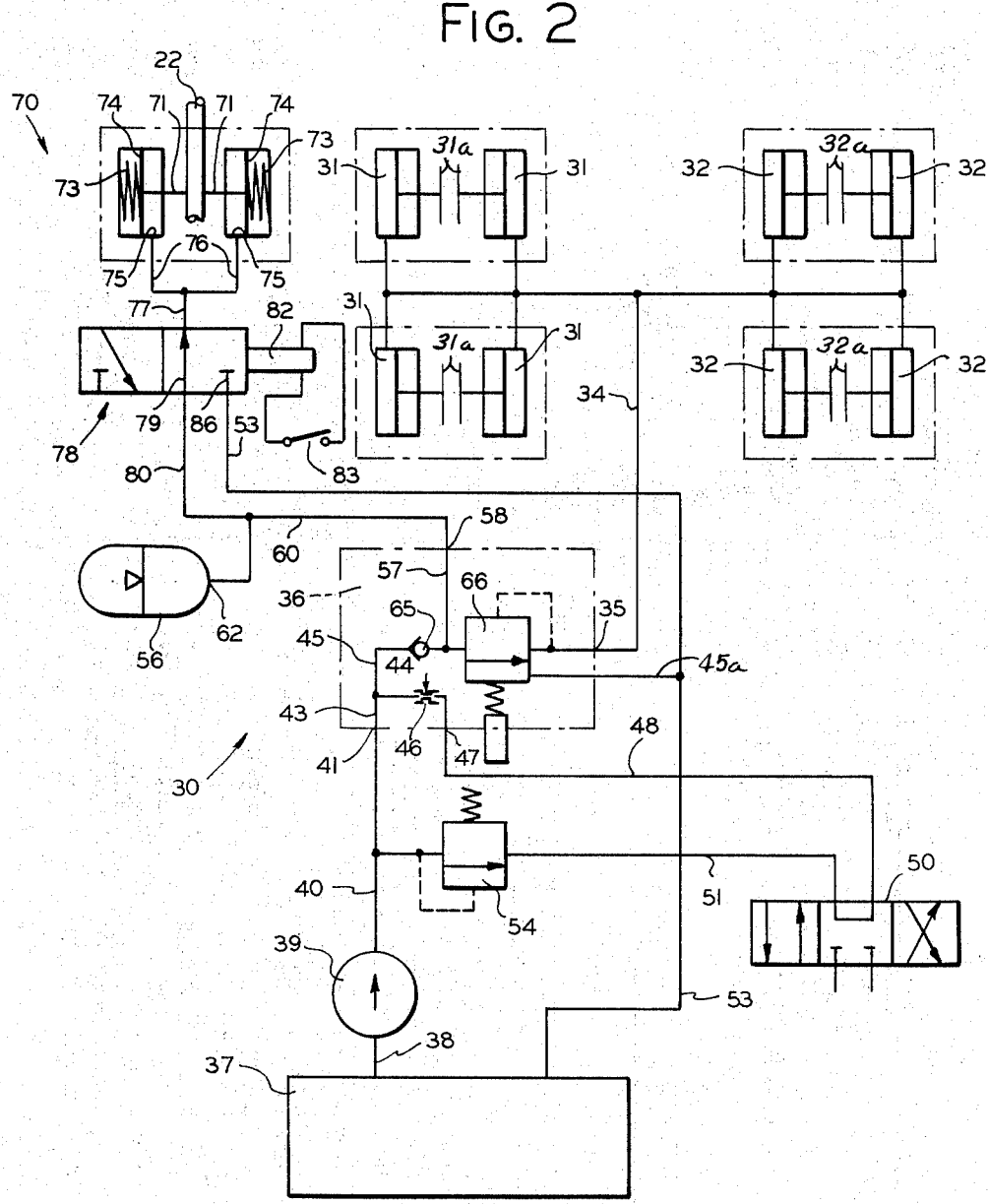
FIG. 2 is a hydraulic schematic showing the components of the power brake and steering system for the scraper in FIG. 1.

Referring now to FIG. 2, an integrated power brake circuit 30 for the tractor scraper 10 includes wheel cylinders 31 for actuating the service brakes heads 31a of the tractor and wheel cylinders 32 for the service brakes heads 32a of the scraper. The tractor or scraper service brakes may be either drum or disc friction type units of well known construction and form no part of the present invention. Wheel cylinders 31,32 are connected to the hydraulic circuit 30 by a brake line 34 connected to an outlet port 35 of a power brake valve 36. A reservoir 37 supplies fluid pressure through a line 38 to a pump 39 which develops fluid pressure supplied through a line 40 to an inlet port 41 of the brake valve 36. A passage 43 leads from the inlet port 41. The outlet port 35 connects line 34 to the big valve with a return branch line 45 through the main return line 53 when the wheel cylinders 31, 32 are exhausted. A passage 44 contains a variable restrictor 46 and connects with passage 43. The variable restrictor insures that the pressure is between maximum and minimum levels suitable for operating the steering jacks 14. A line 48 connects with the outlet port 47 and delivers the steering pressure to a steering valve 50 operable to control the steering jacks 14. The operator controls the steering valve 50 by the steering wheel 16 so as to cause extension of the jack 14 on one side and retraction of the jack 14 on the opposite side effecting a turning motion of the tractor 12 about the turning axis 17. A line 51 connects with the steering valve 50 for returning exhaust fluid from the steering jacks 14 to the reservoir 37 through a main return line 53. A relief valve 54 set at a pressure above the operating pressure for the steering jacks 14 is connected between the supply line 40 and return line 53.

The power steering system carries in circuit the brake valve 36. A portion of the hydraulic steering fluid enters the passage 45 of the brake valve 36. This portion is relatively small so as not to noticeably diminish the supply of hydraulic fluid for operating the steering cylinders 14. This small volume charges an accumulator 56 being delivered through passage 57 of the main brake valve 36 to an outlet port 58. A line 60 connects with the outlet port 58 to the inlet opening of the accumulator 62. So long as accumulator pressure is below a predetermined level for satisfactory operation of the service brake a small quanity of hydraulic fluid is bled from the power steering system to satisfy the demand of the power brake system. For example, the brake valve 36 may remove two or three gallons per minute of the steering fluid until the accumulator 56 reaches the required pressure. A check valve 65 prevents return of the fluid from the accumulator through the passage 57 and into the passage 45.

Thus, the power steering and brake system 30 have a piggyback relationship where both function off of a common circuit portion, valve, pump and reservoir. Still further, in acordance with the invention, emergency/parking brake circuit 70 is integrated therewith. The emergency/parking heads 71 are located on the tractor differential input shaft 22. The heads 71 are actuated by springs 73 acting against plungers 74 operating in cylinder 75 to bias the brake heads 71 in a brake engaging position with respect to the input shaft 22. The chambers 75 connect through lines 76,77 with a solenoid operated valve 78 having a normally open passageway 79 communicating with a line 80 which connects with the accumulator 56. Thus, accumulator pressure is available not only at port 58 of the main power brake valve 36 for operating the service brakes 31,32 of the tractor-scraper vehicle, but also, under normal operating conditions, is applied through the valve 78 to the chambers 75 of the emergency/parking brake so as to pressurize the chambers 75 below the pistons 74 and maintain the springs 73 in a com-pressed state whereby the brake heads 71 are disengaged relative to the input shaft 22. A drop in the accumulator pressure which is below that for safe operation of the service brakes 31,32 due to any reason, such as rupture in the brake line 34, will automatically relieve the pressure in chambers 75 holding the brake heads 71 disengaged, thus allowing the springs 73 to apply the emergency brake heads 71. When the condition which caused the reduction in pressure in the accumulator 56 has been corrected and the brake valve 36 has recharged the accumulator to a safe operating level for the service brakes 31,32 then the pressure will be restored in the chambers 75 again to disengage the emergency brake.

It is also preferred, although not necessarily required, that the valve 78 be selectively operable so that the brake head 71 may be brought into engagement with the input shaft 22 when desired without affecting the charge pressure on the accumulator used for operating the service brakes. In this connection, valve 78 is controlled by solenoid 82 from a switch 83 on the dashboard of the tractor 12. By closing the switch 83 the operator causes the valve element of the valve 78 to shift positions such that the passageway 79 is closed interrupting accumulator pressure supplied through line 80 and instead, the valve element of the valve 78 is shifted to a position connecting the passageway 79 with a passageway 86 which in turn communicates with the return line 53 connected to the reservoir 37. Thus, the operator may selectively engage the brake heads 71 when the vehicle is stopped by closing the switch 83 which exhausts the pressure in chambers 75 and interrupts pressure being supplied by the accumulator 56 in which condition the brake heads 71 engage the input shaft 22 under the action of the spring 73 and serve as parking brakes. When the switch 83 is again opened, the valve 78 returns to its normally open position as depicted in FIG. 2 whereby accumulator pressure is supplied to chambers 75 restoring the brake heads 71 to the disengaged position.

Having thus described a preferred embodiment of the present invention, it will, of course, be understood that various changes may be made in the form, details, arrangement and proportion of the parts without departing from the scope of the invention which consists of the matter shown and described herein and set forth in the appended claims.

I claim:

1. In an off-highway tractor vehicle having articulated sections pivoted about a vertical turning axis, steering jacks connected between said sections for turning one relative to the other about said axis, an engine on one section, a drive train on said section connected to wheels on opposite sides driven by the engine through said drive train, spring disengageable and fluid pressure applyable service brakes for said wheels, support wheels on said other section having spring disengageable and fluid pressure applyable service brakes, the improvement comprising a power brake and steering system including a fluid reservoir, a pump driven by the engine connected to the reservoir, a main brake valve, a steering valve selectively operable for controlling said steering cylinders to effect turning movement of the vehicle sections receiving fluid under pressure from the main brake valve and returning exhaust fluid from the steering cylinders to the reservoir, an accumulator connected to the pump through said main brake valve, an auxiliary brake valve connected to the accumulator, emergency brake means having fluid pressure disengageable-spring applyable brake heads receiving fluid pressure through said auxiliary brake valve from the accumulator, return conduit means from the auxiliary brake valve to said reservoir and means selectively operable controlling said auxiliary brake valve to interrupt fluid pressure from the accumulator to the emergency brake means and connect said return conduit means thereto for rapidly exhausting fluid to the reservoir permitting said emergency brake means to be spring applied.

2. The improvement according to claim 1 wherein said drive train includes a rotatable drive element and said emergency brake means being associated with said rotatable drive element.

3. The improvement according to claim 2 wherein said rotatable drive element is the tractor differential input shaft and said pressure disengageable-spring appliable brake heads, positioned closely adjacent to said shaft, being yieldably engageable therewith when said fluid pressure is exhausted.

* * * * *